Patented Mar. 20, 1945

2,372,031

UNITED STATES PATENT OFFICE 2,372,031

SEPARATION OF REACTION MIXTURES CONTAINING ALDEHYDES

Herbert Muggleton Stanley, Tadworth, and Wilfred Arthur Smart, Epsom, England, assignors to The Distillers Company Limited, Edinburgh, Scotland, a British company No Drawing. Application March 20, 1942, Serial No. 435,562. In Great Britain February 12, 1941

3 Claims. (Cl. 260—601)

This invention is directed to the separation and recovery of the products of the reaction between formaldehyde and aliphatic aldehydes or ketones.

In the catalytic condensation of formaldehyde with aliphatic aldehydes or ketones, the substances remaining in the reaction mixture comprise unchanged aldehyde or ketone, unreacted formaldehyde, various unsaturated aldehydes and ketones and a considerable proportion of water. When this process has been carried out in the past, the separation of the organic reaction products from the reaction mixture has been carried out by fractional distillation and there have been great difficulties in carrying out this distillation on a commercial scale owing to the partial volatilisation of the formaldehyde in the still and its entrainment with the products of distillation, or deposition as solid polymers in the condenser system. In the condensation of acetaldehyde with formaldehyde, for instance, the unchanged acetaldehyde can easily be distilled off but, when the temperature is raised so as to distil off the acrolein, crotonaldehyde and higher unsaturated aldehydes, the formaldehyde volatilises into the condenser system (where it undergoes polymerisation to solid polymers) and necessitates a frequent stoppage of operations to clean out the condenser system. Many proposals have been put forward to overcome this disadvantage but the present invention provides a simple and efficacious solution to the problem.

According to the present invention a process for the treatment of reaction mixtures containing formaldehyde to separate co-present reaction products from the formaldehyde comprises subjecting the reaction mixture, if desired after distilling off low-boiling volatile substances, to an extraction process with a water-immiscible solvent and subjecting the extract to fractional distillation to separate the reaction products dissolved therein from said solvent. By operating in this manner, the residue from the solvent-extraction process consists of a dilute aqueous formaldehyde solution which can be concentrated and used in a subsequent reaction whilst the solvent can be recovered and also re-used.

Solvents suitable for use in this process are hydrocarbons, preferably aromatic hydrocarbons and chlorinated hydrocarbons but higher aliphatic and hydroaromatic alcohols, such as the hexyl alcohols and cyclohexanol, may be used. The preferred solvent is xylene and the solvent-extraction process is preferably carried out in a counter-current multi-stage system.

The following examples of the condensation of formaldehyde with acetaldehyde illustrate the process of this invention.

Example I

A mixture of acetaldehyde and formaldehyde (in the form of a 35% aqueous solution) are vaporised and passed over any known suitable catalyst. The liquid reaction mixture consists of acetaldehyde, acrolein, crotonaldehyde, traces of various higher unsaturated aldehydes and a considerable proportion of a dilute aqueous formaldehyde solution.

This liquid mixture is heated so as to distil off the unchanged acetaldehyde. Very little volatilisation of formaldehyde occurs and the amount carried over is insufficient to affect the condenser system. The residue from the distillation is then subjected to a counter-current, multi-stage extraction with xylene whereby the aldehydes are obtained in a solution substantially free of formaldehyde and of water.

Fractional distillation of the xylene solution results in substantially pure acrolein and crotonaldehyde fractions whilst the xylene is returned to the extraction stage.

Example II

The liquid reaction product obtained by passing a vapourised mixture of 48.75 kg. per hour of acetaldehyde and 98.25 kg./hr. of 35% aqueous formalin over a solid catalyst at about 280–290° C. was passed to a continuous still where unchanged acetaldehyde (26.8 kg./hr.) was stripped off. The aqueous residue, about 114 kg./hr., containing approximately 19% formaldehyde, 18% acrolein, 1–2% crotonaldehyde and traces of acetaldehyde and oily condensation products, was cooled and subjected to continuous countercurrent extraction with about 70 kg./hr. of xylene in an 8-stage contact system consisting of a series of agitated vessels each filled with a separating device. As a result of this treatment the aqueous phase was practically completely stripped of acrolein, crotonaldehyde and any higher condensation products and there remained an aqueous formalin suitable for reconcentration to 30% strength by any of the known methods and containing only 0.3% acrolein. The separated xylene, containing 98% of the acrolein initially present in the aqueous phase, was then fractionated to yield first acrolein and then crotonaldehyde, the xylene being subsequently cooled and returned to the extraction process.

When the process is applied to the recovery of the products of condensation of formaldehyde with higher aliphatic aldehydes or ketones a slightly modified procedure can in many cases usefully be employed. Owing to the higher boiling points of the aldehydes or ketones there is the likelihood of an increased carry-over of formaldehyde and therefore the preliminary distillation is dispensed with and the whole of the reaction product is subjected to the solvent-extraction process and the solution, after separation from the aqueous phase, is distilled to yield fractions consisting of the unchanged aldehydic or ketonic starting material, the desired unsaturated products and the solvent containing the undesired high-molecular weight by-products.

What we claim is:

1. A process for the manufacture of acrolein by the gaseous phase catalytic condensation of aqueous formaldehyde with acetaldehyde, which comprises separating acrolein from the co-present formaldehyde and water in the liquefied reaction products resulting from the condensation, by extraction of the latter with xylene and fractional distillation of the extract to separate acrolein from said xylene.

2. A process for the manufacture of acrolein by the gaseous phase catalytic condensation of aqueous formaldehyde with acetaldehyde, which comprises separating acrolein from the co-present formaldehyde and water in the liquefied reaction products resulting from the condensation, by extraction of the latter with xylene in countercurrent flow and fractional distillation of the extract to separate acrolein from said xylene in countercurrent flow.

3. A process for the manufacture of acrolein by the gaseous phase catalytic condensation of aqueous formaldehyde with acetaldehyde, which comprises subjecting the liquefied reaction products resulting from the condensation, to a distillation to remove any unreacted acetaldehyde, at a temperature such that substantially no formaldehyde is volatilised, thereafter extracting the aqueous residue with xylene and fractionally distilling the extract to recover acrolein therefrom.

HERBERT MUGGLETON STANLEY.
WILFRED ARTHUR SMART.